July 4, 1933.   C. C. HARPSTER   1,916,369
LIQUID INFUSION DEVICE
Filed Dec. 19, 1930
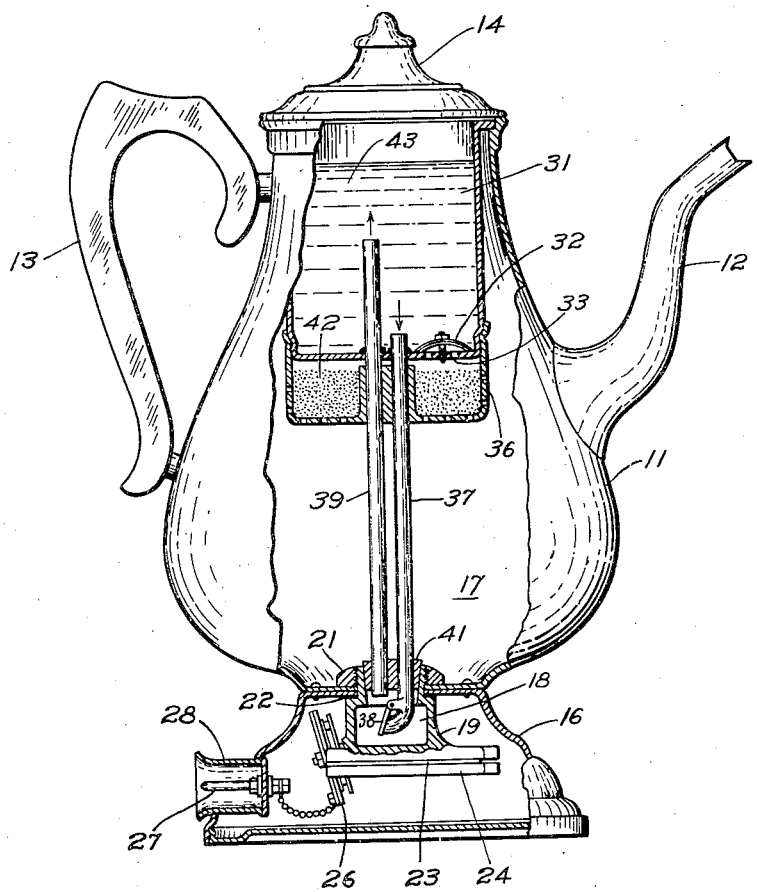
WITNESSES:
INVENTOR
Clyde C. Harpster.
BY
ATTORNEY Patented July 4, 1933

1,916,369

UNITED STATES PATENT OFFICE

CLYDE C. HARPSTER, OF MADISON TOWNSHIP, RICHLAND COUNTY, OHIO, ASSIGNOR TO WESTINGHOUSE ELECTRIC & MANUFACTURING COMPANY, A CORPORATION OF PENNSYLVANIA

LIQUID INFUSION DEVICE

Application filed December 19, 1930. Serial No. 503,425.

My invention relates to fluid heating devices and particularly to percolators.

An object of my invention, when considered in its broadest aspect, is to provide a circulatory heating system for a liquid in which substantially all of the liquid is heated to a predetermined temperature before it is permitted to flow into a second container to operate on material located therein.

Another object of my invention is to provide a relatively simple, inexpensive and compact percolator assembly which may be used for making so called "French drip" coffee.

In practicing my invention, I provide a casing, a water container and a material basket, the latter two elements being located in nested relation to each other and within the casing at the top thereof. A vaporizing chamber and a heating element therefor are provided at the bottom of the casing, and a percolating-tube structure extends from the vaporizing chamber upwardly into proper operative relation to the water container and may support both the water container and the material basket.

A thermally-actuable valve prevents water in the water container from flowing out of it and into the material basket until substantially all of the water in the container has been heated to a predetermined temperature.

A thermostatic switch is associated with the heating unit to control its operation.

The single figure of the drawing is a side elevational view of a percolator structure embodying my invention, portions being cut away and interior portions being shown in vertical section.

A hollow body or receptacle 11 is provided, which may be of any desired contour, and is shown in the drawing as of conventional portable percolator shape, including a spout 12, a handle 13, a cover 14 and a hollow base 16, all of which may be assembled in the usual manner. The bottom portion of the body 11 provides a chamber 17 to receive the infusion or beverage, which is prepared in the device embodying my invention, in a manner to be hereinafter set forth in detail.

A vaporizing chamber 18 is provided in a depending metal member 19 having a central portion extending upwardly through an opening in the bottom of the body 11 and the top of base 16. A nut 21 has a screw-threaded engagement with that portion of the member 19 which projects into the chamber 17, to provide a fluid-tight joint, a gasket 22 being also provided, if desired.

An electric heating unit 23 is supported by member 19, to which it is clamped by a bottom clamping plate 24, in any suitable or desired manner, in order that the member 19 and any fluid which may be located in the vaporizing chamber 18 may be heated. Heat is also conducted through the upper central portion of member 19 and nut 21 to any fluid or beverage contained in chamber 17, as will be more clearly set forth hereinafter.

A thermostatic switch 26, including a thermally actuable member and circuit-controlling contact members associated therewith, is mounted on member 19, the electric connections being such that the switch controls the energization of heating unit 23.

A pair of terminal pins 27, of usual construction, are located within a terminal-pin guard 28, which latter is supported by a wall of the hollow base 16, the pins 27 being engageable by cooperating contact members of a contact plug, in a manner well known in the art.

A water container 31 is located within the upper portion of body 11 and has a thermally-actuable valve 32 supported in such position at the bottom thereof as to normally prevent the passage of liquid from the container through a plurality of openings 33 with which the container bottom is provided. I have illustrated a bimetallic disc as constituting the valve 32, the disc being suitably supported on a central stud or bolt, the operation of this device being such that the disc 32 engages the interior surface of the bottom of container 31 to prevent outflow of water from the container until substantially all of the water therein shall have been raised to a predetermined temperature which, in the case of a percolator, will be close to the boiling point of water.

A basket 36, of conventional form, having perforated peripheral and bottom walls, is provided, and, as shown in the drawing, the water container 31 may be nested within the basket.

A percolating-tube structure includes a down-draft tube 37, having a flap valve 38 at its lower end which is within the vaporizing chamber 18, an up-draft tube 39 and a plug 41 into which the bottom ends of the tubes 37 and 39 may be tightly fitted to provide a fluid-tight joint. As shown in the drawing, the upper ends of the two tubes 37 and 39 may be soldered to the bottom wall of container 31, the basket 36 being slidable on the tubes 37 and 39, but such construction is for illustrative purposes only. Any other construction effective for the same result may be employed. While I have shown the member 41 as being of tapered-plug shape to fit into the correspondingly tapered upper end of member 19, I do not desire to be limited thereto, it being permissible to utilize a screw joint instead of a plain conical plug and socket, particularly if it should be found advisable to employ a screw socket to effect a water-tight joint.

The operation of the device is substantially as follows:

A suitable amount of infusion material, such as ground coffee, shown at 42, is placed in the basket 36, and a suitable quantity of water 43 is placed in the container 31, this filling of the container being done when the parts are in the positions shown in the drawing, in order that the water may not flow out of the container 31, as would happen if the lower part of the percolating-tube structure were not interfitted with the vaporizing chamber.

If, now, the heating unit 23 is energized, heating of the water in container 31 is effected by percolating action, in a manner well known in the art. Substantially all of the water in container 31 will be heated to a predetermined temperature, which is very close to that of the boiling point of water, the adjustment of the thermostatic valve 32 being such that it remains in the position shown in the drawing to prevent water flowing out of the container until substantially all of it has been heated to the desired temperature.

As soon as the bimetallic disc or member 32 is heated to a temperature at which it will move, either slowly or with a snap action, into a different position, this action will occur and water will flow through the openings 33 into the basket 36, thereby making an infusion or beverage which will drip downwardly, through the openings in the basket, into the infusion container 17.

The construction and operation of valve 32 is such that it remains in its open position so long as there is any water in container 31, thus ensuring, first, that no water will flow out of the container until all of it has been heated to the desired temperature and, second, that all of it will flow through and engage the infusion material in a continuous stream. When the water has thus been transferred, after contact with the infusion material, to the infusing-containing chamber 17, it will remain there until poured out for use.

If the liquid is not to be used immediately, the heating unit 23 will operate to maintain it at a desired temperature by heat transmitted, through member 19, nut 21 and plug 41, to the infusion in container 17.

While, of course, the adjustment of thermostatic switch 26 is the same for both conditions of operation, it is possible to maintain the infusion at a somewhat different temperature than that of the water in the container by proper design of the heat-conducting portions of member 19.

The device embodying my invention thus provides a relatively simple and compact device which may be embodied in an infusion device in which the water may be heated by percolating action, and the infusion maintained at a predetermined temperature by conducted heat. The valve in the water container prevents outflow until substantially all of the water in the container has been heated to a predetermined temperature at which the best action of the water on the ground material is obtained, in order to make the best possible infusion or beverage.

While I have illustrated and described a coffee percolator, I may utilize the construction embodying the invention for making other kinds of liquid infusions, as may be required for industrial purposes.

Various modifications may be made in the device embodying my invention without departing from the spirit and scope thereof, and I desire, therefore, that only such limitations shall be placed thereon as are imposed by the prior art or are set forth in the appended claims.

I claim as my invention:

1. A percolator including a coffee-beverage container, a ground-coffee basket and a water container thereabove and both located in the coffee-beverage container, means for heating water in the water container by percolating, and means in said water container to ensure that water shall flow therefrom into the coffee basket in a continuous stream when the temperature of the water has reached a predetermined value.

2. A percolator including a coffee-beverage container, a ground-coffee basket and a water container thereabove and both located in the coffee-beverage container, electrically heated means for heating water in said water container by percolating action, and a thermally-actuable valve in the bottom of the water container to retain water therein until all of it has been heated to a predetermined temperature and then to ensure its flow therefrom and into the coffee basket in a continuous stream.

3. A percolator including a coffee-beverage container, a coffee basket and a water container located within the beverage container, means for heating substantially all of the water in the water container to a predetermined temperature and then effecting the discharge thereof from the water container through the coffee basket and into the beverage container, and thermally-actuable means on said heating means for controlling the same to maintain the coffee beverage at a second predetermined temperature.

4. A percolator including a beverage container having a vaporizing chamber, a twin-percolating-tube structure closing said vaporizing chamber and having an infusion-material container mounted thereon, a water container supported by the beverage container, heating means adjacent the vaporizing chamber to heat water in the water container by percolator action, a thermally-controlled vent in the water container for precluding water therein flowing through the infusion-material container in a continuous stream until the temperature of the water has reached a predetermined value and a thermostatic means controlling the heating means to maintain the infusion at a second predetermined temperature value.

5. A percolator including a beverage container, a material-containing basket and a water container, means for heating substantially all of the water in the water container to a predetermined temperature and then effecting the discharge thereof through the material-containing basket and into the beverage container, and thermally actuable means on said heating means for controlling the same to maintain the beverage at a second predetermined temperature.

In testimony whereof, I have hereunto subscribed my name this eighth day of December 1930.

CLYDE C. HARPSTER.